(12) United States Patent
Lu et al.

(10) Patent No.: US 7,496,209 B2
(45) Date of Patent: Feb. 24, 2009

(54) TECHNIQUES AND SYSTEMS FOR EMBEDDING AND DETECTING WATERMARKS IN DIGITAL DATA

(75) Inventors: Wei Lu, Singapore (SG); Jian Zhang, Singapore (SG)

(73) Assignee: Sony Corporation, Tokyo (JP)

( * ) Notice: Subject to any disclaimer, the term of this patent is extended or adjusted under 35 U.S.C. 154(b) by 926 days.

(21) Appl. No.: 10/900,738

(22) Filed: Jul. 27, 2004

(65) Prior Publication Data

US 2005/0025337 A1 Feb. 3, 2005

(30) Foreign Application Priority Data

Jul. 29, 2003 (SG) ................................ 200304195

(51) Int. Cl.
*G06K 9/00* (2006.01)
*G09C 3/00* (2006.01)
*H04L 9/00* (2006.01)

(52) U.S. Cl. ........................... 382/100; 380/54; 380/55; 713/176

(58) Field of Classification Search ................ 382/100; 713/716; 380/54, 55
See application file for complete search history.

(56) References Cited

U.S. PATENT DOCUMENTS

| | | | |
|---|---|---|---|
| 6,049,627 A * | 4/2000 | Becker et al. ............... | 382/181 |
| 6,359,998 B1 * | 3/2002 | Cooklev ..................... | 382/100 |
| 6,512,836 B1 | 1/2003 | Xie et al. | |
| 6,556,688 B1 * | 4/2003 | Ratnakar ..................... | 382/100 |
| 6,847,376 B2 * | 1/2005 | Engeldrum et al. ......... | 345/600 |
| 7,046,818 B2 * | 5/2006 | Ratnakar et al. ............ | 382/100 |
| 7,187,806 B2 * | 3/2007 | Damera-Venkata ......... | 382/252 |
| 2002/0184502 A1 | 12/2002 | Sall et al. | |

OTHER PUBLICATIONS

Zhao, Jian et al "Embedding Robust Labels into Images for Copyright Protetion", Aug. 1995, pp. 1-10.*

Gonzalez-Serrano F J et al: "Independent Component analysis applied to digital image watermarking" IEEE International Conference on Acoustics, Speech, and Signal Processing. Proceedings. (ICASSP), Salt Lake City, UT, US, vol. vol. 3 of 6, (May 7, 2001), pp. 1997-2000, XP002253553 ISBN: 0-7803-7041-4.

(Continued)

*Primary Examiner*—Vikkram Bali
*Assistant Examiner*—Soo Jin Park
(74) *Attorney, Agent, or Firm*—Frommer Lawrence & Haug LLP; William S. Frommer; Thomas F. Presson

(57) ABSTRACT

A method for embedding and detecting watermarks in digital data. Data is analysed by an independent component analysis to derive a transform matrix W encoding properties of the data. The data is encoded using this transform matrix W, and a watermark is embedded into it. Then the inverse of the transform matrix is applied to obtain watermarked data. The presence of the watermark is found by applying the transform matrix again, and examining the result for the presence of the watermark.

36 Claims, 10 Drawing Sheets

OTHER PUBLICATIONS

Ju Liu et al: "Embodying information into images by an MMI-based independent component analysis algorithm" ICSP'02. 2006 6$^{TH}$ International Conference on Signal Processing Proceedings (Cat. No. 02TH8624) IEEE Piscatway, NJ, USA, vol. 2, 2002, pp. 1600-1603, vol., XP002330068 ISBN: 0-7803-7488-6.

Hartung F et al: "Watermarking of uncompressed and compressed video" Signal Processing, Elsevier Science Publishers B.V. Amsterdam, NL, vol. 66, No. 3, (May 28, 1998), pp. 283-301, XP004124953 ISSN: 0165-1684.

Bell A J et al: "The independent components of natural scenes are edge filters" Vision Research Elsevier UK, vol. 37, No. 23, (Dec. 1997), pp. 3327-3338, XP002330069 ISSN: 0042-6989.

Leach K N: "A survey paper on independent component analysis" System Theory, 2002. Proceedings of the Thirty-Fourth Southeastern Symposium on Mar. 18-19, 2002, Piscataway, NJ, USA,IEEE, (Mar. 18, 2002), pp. 239-242, XP010599095 ISBN: 0-7803-7339-1.

TW484325B (Shiu Wen-Shing) (Apr. 21, 2002).

\* cited by examiner

BEST AVAILABLE COPY

SPACE

FREQUENCY

TECHNIQUES AND SYSTEMS FOR EMBEDDING AND DETECTING WATERMARKS IN DIGITAL DATA

FIELD OF THE INVENTION

The present invention relates to techniques for embedding and detecting watermarks in digital data, particularly image data.

BACKGROUND OF INVENTION

With the development of the digital technology, there has been an explosion in use of digital multimedia data. Analogue audio and video equipment is gradually in the process of being replaced by its digital successors. With help of the digital storage and Internet connections, the distribution of multimedia data and applications is becoming much easier and faster, so copyright issues are increasingly important to the owners of the digital content data, and for this reason techniques are being developed for modifying digital data ("watermarking" the data), in such a way that the fact that the data has been modified can be detected. Digital watermarking technology makes it easier for copyright to be enforced, because it makes it easier for the copyright owner to prove that the data originates from him. However, digital watermarking is not only used for copyright protection, but also for indexing, captioning, data hiding, etc.

A watermarking system usually has two stages: (i) watermark embedding and (ii) watermark detection/extraction. When it is required to protect the ownership of the image, the embedded watermark is detected and extracted from the modified image.

A first key issue in technology for embedding watermarks is the choice of the domain ("workspace") in which watermark embedding should be performed.

For example, existing watermarking techniques operate in the spatial domain, discrete cosine transform (DCT) domain, Mellin-Fourier transform domain, wavelet domain, etc. A further key issue is the selection of the pixels, blocks or transform coefficients where the watermarks should be hidden.

Desirably, a watermark is embedded in a host image by modifying the image so that the modifications in the image are not visible. Such "imperceptibility" is one of the most important requirements in image watermarking systems. Also, desirably, the watermark should be hard to remove (to "attack").

We now review some known watermarking techniques in relation to these two desiderata.

(1) Spatial domain watermarking is the most straightforward watermarking technique. An advantage of the spatial domain techniques is that they can be easily applied to any image, regardless of subsequent processing. One approach is called the Least-Significant-Bits modification method (LSB). In this technique the watermark may be embedded anywhere in the host image, so there is a high channel capacity and a small watermark object may be embedded multiple times. Even if most of these objects are lost due to attacks, a single surviving watermark would be considered a success. LSB substitution, however, despite its simplicity brings a host of drawbacks. Although it may survive transformations such as cropping, any addition of noise or lossy compression will totally remove the watermark. An even better attack is simply to set the LSB bits of each pixel, since this would fully remove the watermark with negligible impact on the original data. Furthermore, once the embedding algorithm is known, the embedded watermark can be easily discovered. An improvement on basic LSB substitution is to use a pseudo-random number generator to determine the pixels to be used for embedding based on a given "seed" or key. More advanced spatial domain methods exist too, such as correlation based techniques. Another disadvantage of spatial techniques is that the embedding technique for producing them cannot be published without making the watermark more easily removable. In addition, adaptive watermarking techniques are difficult in the spatial domain, as it is hard to distinguish between smooth and noisy regions.

(2) Discrete Cosine Transform (DCT) domain watermarking has been widely studied in the context of JPEG and MPEG, normally in the mid-frequency AC components. Embedding operations in the DCT domain are often robust to JPEG and MPEG compression, so the watermark can resist JPEG/MPEG attacks more easily. Watermarking in DCT domain offers the possibility of embedding watermarks directly in the compressed format, so as to minimise the computation time. However, previous studies on visibility in DCT domain compression predict the visible impact of the watermark on the watermarked image. Usually, the watermark is embedded in the low-frequency AC coefficients in the DCT domain.

(3) Wavelet domain techniques exploit the Wavelet analysis signal processing method which has been popularly applied in image processing in recent decades. Wavelet analysis is usually based on multi-resolution analysis (MRA) which analyzes an image in detail in the frequency domain. The wavelet transform consists of a multiscale spatial-frequency decomposition of an image, e.g. into four bands such as an approximate image LL and three detail images LH, HL and HH. The MRA is compatible with perception by human eyes, therefore, it is helpful in managing a good selection of watermark embedding locations in the original image in terms of robustness versus visibility. Wavelets are also key in the ongoing compression standard JPEG2000, so wavelet domain watermarking also has the advantage of robustness to JPEG2000 compression.

(4) Most watermarking techniques encounter serious problems in extracting watermarks after an affined geometric distortion, i.e. image rotation, scaling and translation (RST), which is called mis-synchronization. For this reason Mellin-Fourier Transform domain watermarking techniques have been introduced since this transform is invariant under RST transformations and even their combination and permutation in any order. Watermarking in this way may also have the advantage of combining the watermarking embedding process with methods dealing with solving geometric distortion problems. However, one drawback is that this watermarking technique increases the complexity of watermarking very much so practical adoption of such techniques may not be possible. Another disadvantage is that it may not be easy to achieve imperceptibility of the watermarks.

The final judgement on the "imperceptibility" of watermarks relies on human eyes. Therefore, the workspace and the techniques used within that workspace should ideally be selected based on our Human Vision System (HVS). However, none of the above-mentioned watermarking domains are directly based on HVS, but instead are derived from frequency-based mathematical functions. Although some known wavelet watermarking techniques select the watermark embedding locations in accordance with HVS by selecting certain frequency bands for watermark embedding, these techniques do not fully satisfy the requirements of HVS and do not guarantee the invisibility of the embedding.

SUMMARY OF THE INVENTION

The invention aims to provide new and useful techniques for embedding watermarks in data, such as image data, and to provide new and useful devices for carrying out this process.

The invention further aims to provide new and useful methods and apparatus for recognising the watermarks.

In general terms, the invention proposes that data (particularly, image data) is analysed to derive a transform matrix which encodes statistically mutually independent components of the data. Applying this transform to the data results in the amplitudes of these statistically independent components. The watermark is added by modifying these amplitudes, and then the inverse of the transform matrix is applied to obtain the watermarked data. The presence of the watermark is found by applying the transform matrix again, and examining the result for the presence of the watermark.

Thus, in contrast to the known watermarking techniques described above in which the transform functions are fixed, and which are not flexible to various types of images, the present technique is "image-adaptive". This may make the watermark hard to remove (to "attack"), and improves image imperceptibility.

Preferably the transform process is the one commonly known as an Independent Component Analysis (ICA), so that the transform matrix (the ICA analysis filters) performs transforms the original image data (the "host image") into the ICA domain for the watermark embedding, and the inverse of the transform matrix (the ICA synthesis filters) transforms it back into the space domain. However, many variants are conceivable of the ICA process, and the present invention is not limited to the use of the algorithms which are presently referred to as ICA.

Particularly for 2D image processing, the ICA analysis and synthesis filters have the properties of spatial-domain localization, orientation and frequency-domain band-pass. it is well known that the primary cells of human visual cortex exhibit similar properties: they are localized, oriented and band-pass [2][3]. In other words, most of the ICA image features obtained by an ICA transform represent the edge details that are the most essential elements in images, referred to as perceptually significant components. It is known that when an image is modified to add a feature which is similar to an existing perceptually significant feature, that added factor is hardly visible (it is "masked"). Thus, basing the watermarks on the visually significant features implies good imperceptibility.

The distribution of ICA coefficients is "sparse", in the sense that there are few large coefficients, implying that these large values are statistically significant. Furthermore, since the watermarks are added in a way which is based on the significant features of the image, this ICA-based watermarking technique is robust against any image processing technique (e.g. compression) which does not inflict significant damage to the image. For example, most conventional image operations remove high-frequency components in images because of they are not significant to the quality of the viewed image, but ICA features are band-passed in the mid-band-frequency.

Furthermore, in general, attacks which tend to remove or weaken watermarks are designed not affect major image contents, and therefore do not affect the present watermarks to a great extent. Therefore, in the present system, the watermarks are robust under various attacks. If the attacks try to remove or reduce WM, the image quality will also be affected significantly, which is not desired.

The ICA transform is preferably found from analysis of a number of "patches", that is sections of the host image. These patches may be obtained from the host image at random. In general the ICA transform based on any given set of patches tends to be statistically very independent from those through other ICA transforms.

Preferably, the present watermark embedding and detection scheme uses a pseudo-random sequence with a private key to spread the watermark bits to multiple ICA features. The length of a WM pattern is also preferably kept as long as possible to reduce mismatch problem due to the strong alternations from image operations.

This invention is not only applicable to original raw images, but also extendable to any compressed images. Optionally, the compressed images can be decompressed and treated as the target host images, the same watermarking system can be applied to them, then they can be compressed again. Alternatively, the method can be applied directly on the compressed images.

The watermark detection method may be performed, in different embodiments of the invention, either employing the original host image, or not doing so. The embedding method may vary according to which of these two approaches is to be used for detecting the watermark.

As discussed in detail below, many variations are possible within the scope of the invention according to the application in which it is to be used. For example (i) in the manner in which it is determined which of the encoded values the watermark should be added to, (ii) how the watermark patterns are generated, and (iii) how the watermark is added (e.g. linearly, or non-linearly such as by modifying certain of the encoded values so that differences between them fall into pre-selected ranges).

Specifically, a first expression of the invention is a method for embedding a watermark in data, including the steps of:
   (i) analysing the data to derive a transform matrix for extracting from the data the amplitudes of statistically mutually independent components of the data,
   (ii) encoding the data using the transform matrix,
   (iii) modifying at least a portion of the encoded data using a watermark pattern, and
   (iv) decoding the data using an inverse of the transform matrix to obtain watermarked data in which the watermark pattern is embedded.

Another expression of the invention is the method used to detect the watermark image from the watermarked data.

Alternative expressions of the invention are apparatus having means for performing the steps of these methods. In particular, the means may be a processing device (not necessarily a single physical unit; optionally the processor may be made up of multiple individual integrated circuits).

BRIEF DESCRIPTION OF THE FIGURES

Preferred features of the invention will now be described, for the sake of illustration only, with reference to the following figures in which.

DETAILED DESCRIPTION OF THE EMBODIMENTS

Before describing in detail the embodiment of the present invention, the ICA technique for processing data such as image data will be described briefly. Note that this technique is not presently known in the present technical field: watermarking of data.

The ICA technique is a signal processing method that transforms a signal to mutually independent components in the complete statistical sense. In image processing, the image coefficients obtained from one ICA feature (transform) are statistically independent from those from other ICA features. In other words, each ICA feature (transform), consisting of an analysis filter and a synthesis filter, uniquely and accurately represents a particular common shape in the image very well, and in an way which is very different from other features. This kind of transform gives a set of features with the least representation redundancy among them.

As an example, suppose that X is an observation matrix with each row $x_i$ as an observed vector. The ICA tries to find a transform matrix W by any means, e.g. data-adaptive learning, so that the transformed vectors $y_i$ on rows of the transformed data Y=W×X are statistically independent from each other. Mathematically, this independence means that the correlation (at second order or above) of any functions, f on any transformed data $y_i$ and $y_j$ in Y (i≠j) is equal to zero: $f_1(y_i)*f_2(y_j)=0$.

Figure 1A:
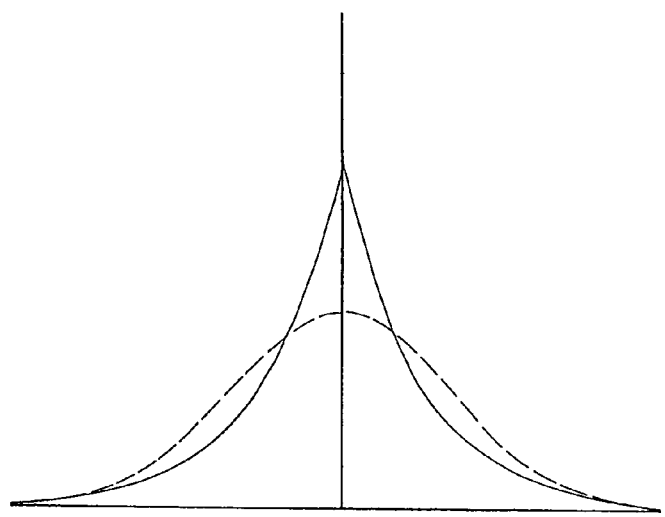
FIG. 1, which is composed of FIGS. 1(a) to 1(e), illustrates some properties of an ICA image.
Figure 1B:
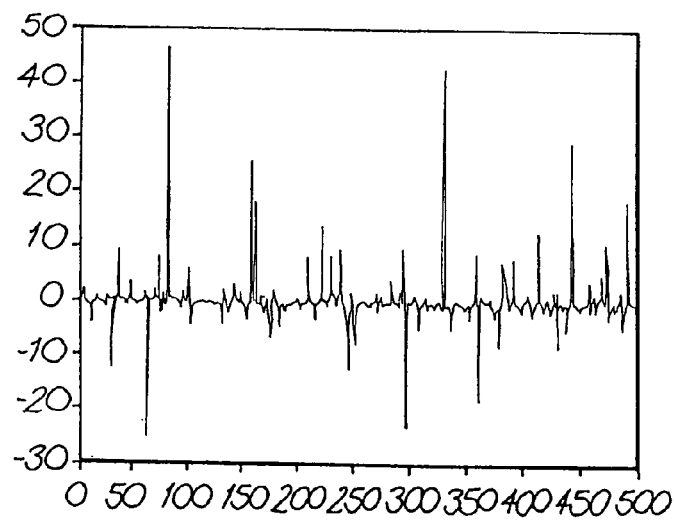
Figure 1C:
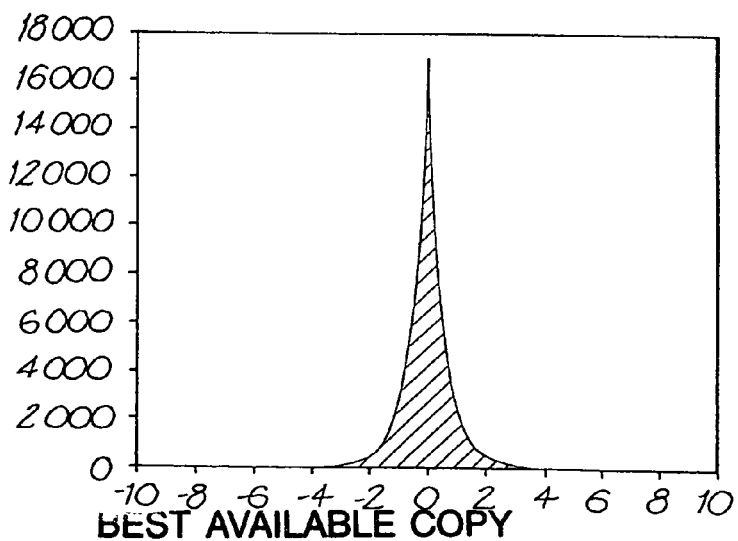

In ICA-based image analysis, in addition to the components' independence, the amplitudes of each ICA-transformed component usually have a probability density function (pdf) which is a very sparse distribution, also known as a super-Gaussian distribution. The properties of this probability distribution are 1) a very high peak appearing at the mean value of the distribution, 2) a long tail appearing at the two sides. FIG. 1(a) shows a typical super-Gaussian distribution (shown as "line 1") compared to Gaussian distribution (shown as "line 2"). FIG. 1(b) shows an example of ICA coefficients and FIG. 1(c) is a corresponding histogram with a super-Gaussian distribution. From FIG. 1(c), we can notice two properties of the amplitudes of ICA coefficients: a small number of coefficients have very large values, very significant to represent images; a large number of coefficients have small values. These would bring some benefits in watermark embedding and detection.

Although the ICA transform picks out many kinds of different ICA features from each individual image, they all have in common that that the features are spatially oriented, bandpassed, and localized both in the spatial and frequency domains [3][8]. In other words, they are some edges and bars with certain angles, widths and lengths. These are actually the essential elements or significant shapes in 2D images. Interestingly, these are also matched with the primary neural cell patterns in the human visual cortex.

It is now believed that the HVS splits visual stimuli from the retina of the eye into many different components. These components pass by different tuned channels from the retina to the cortex, each channel being tuned to a different respective component [2][4][5]. The characteristics of a component in the visual field are Its location (corresponding to its co-ordinates in the image domain)

Its orientation (corresponding to a phase in the Fourier domain)

A spatial frequency (corresponding to a magnitude in the Fourier domain).

A perceptive channel can only be stimulated by a signal whose characteristics are tuned to its own characteristics. Different channels have different characteristics. Moreover, according to the perceptive model of human vision [5], signals that have similar characteristics use the same channels from the eye to the cortex. It appears that such signals interact and are subject to non-linear effects. Masking is one of those effects. Masking occurs when a signal cannot be seen because of another signal with close characteristics but at a higher energy level [6][7].

Figure 1D:
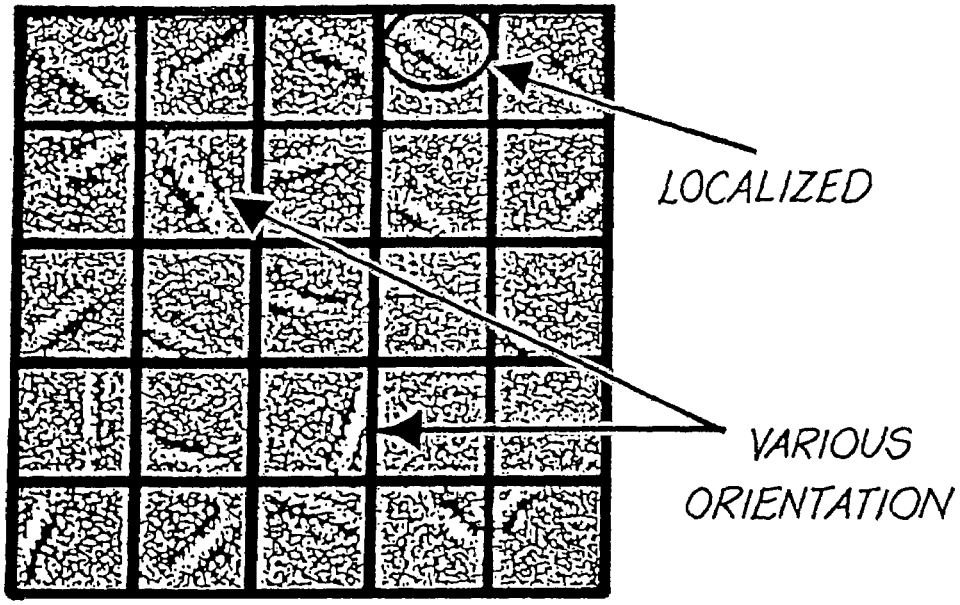
Figure 1E:
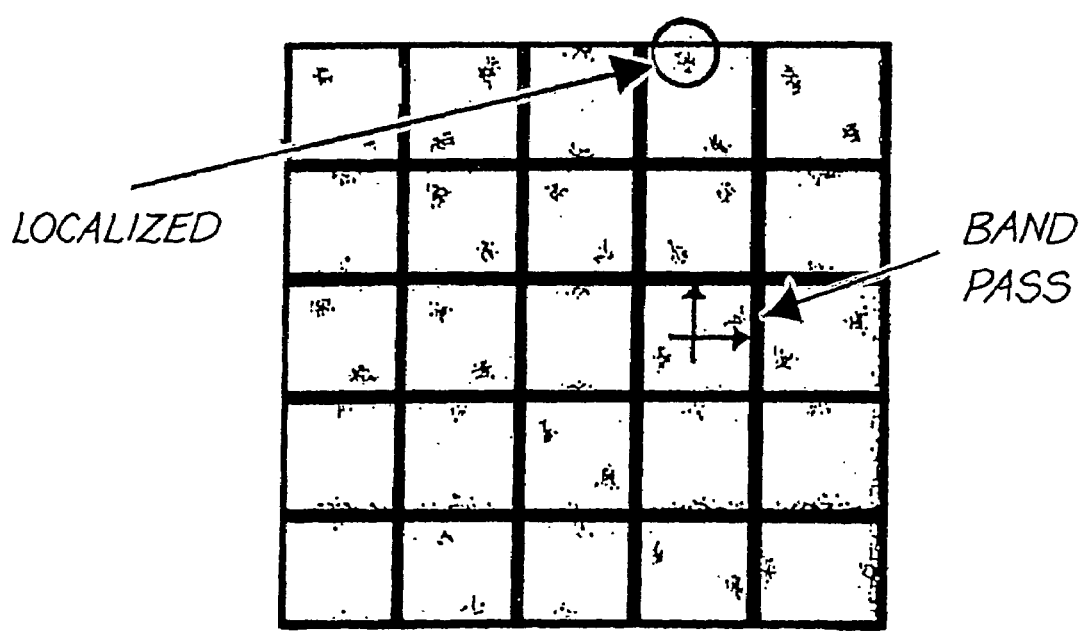

As the characteristics of a component in the visual field closely match the properties of features in the ICA transform, most of ICA image features obtained by ICA transform represent the edge-like or bar-like details that are the most essential elements in images: perceptually significant components. The features are shown in FIG. 1. FIG. 1(d) shows a part of the transform W for a typical image, and FIG. 1(e) the Fourier transform of it. In both cases amplitude values are represented as grey-scale values. FIG. 1(d) high amplitudes are white, whereas in FIG. 1(e) high amplitudes are dark.

Figure 2:
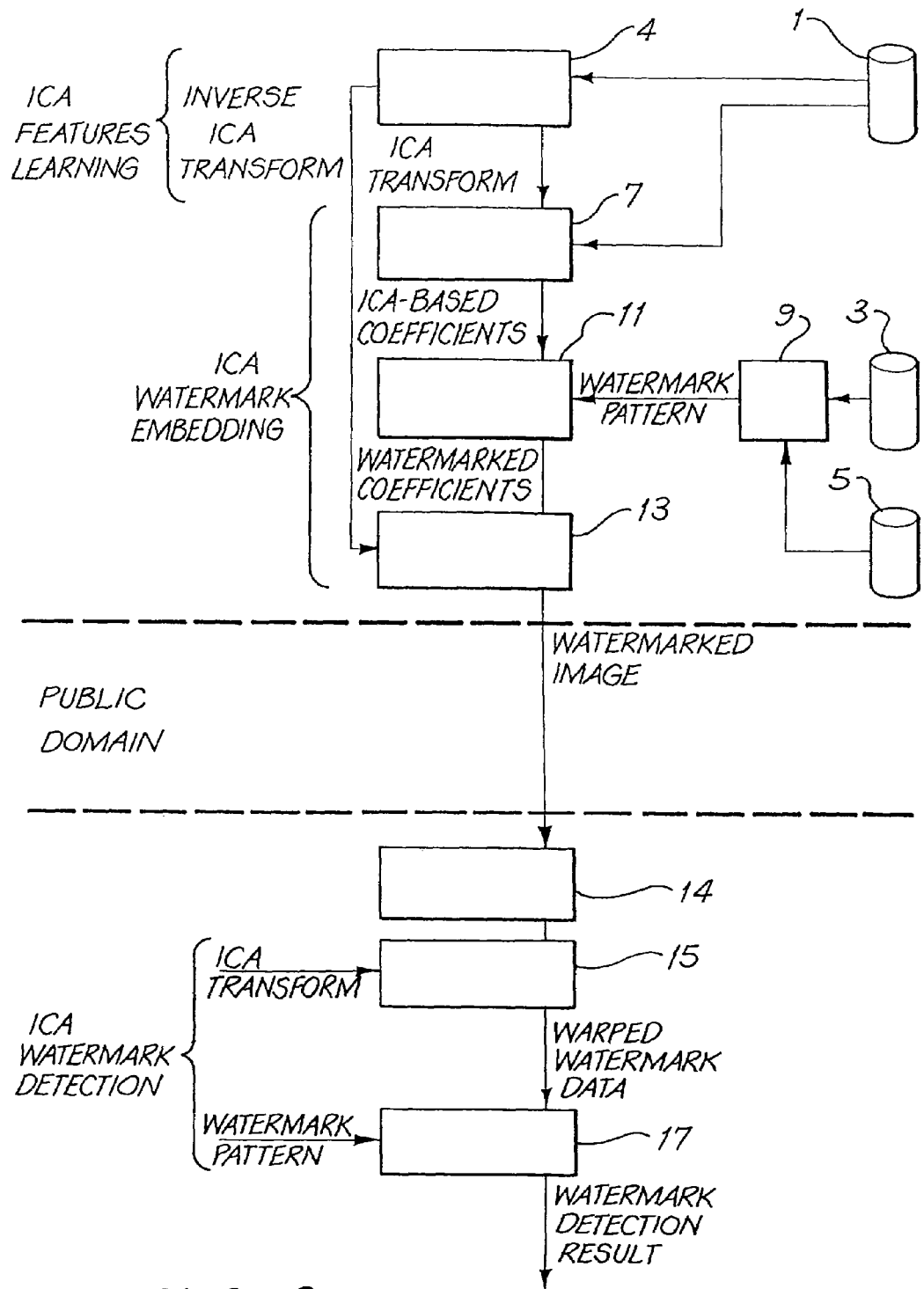
FIG. 2 is the flowchart of a ICA-based watermarking system which is an embodiment of the invention.

Referring to FIG. 2, the method which is an embodiment of the invention of embedding and detection of watermarks in images is illustrated schematically, acting on an image taken from a database 1.

In a first stage of the embedding process, "ICA feature learning", the image from the database 1 is used by a unit marked as 4 to obtain an ICA transform and an ICA inverse transform (as described below in detail with reference to FIG. 3).

In a second stage of the embedding process, "ICA-WM embedding", the ICA transform is used together with the image from the database 1 to generate ICA-based coefficients (by a unit shown as 7). A watermark from a second database 3 and a key from a third database 5 are used by a unit shown as 9 to produce a watermark pattern, which is combined by a unit shown as 11 with the ICA-based coefficients to form watermarked coefficients. The watermarked coefficients are then transformed by a unit 13 using the inverse ICA transform to produce the watermarked image.

Once this watermarked image has been generated it can be put into the public domain, where it is typically subjected to compression/decompression operations, attack, and noise.

In the detecting process, "ICA-WM detection", there is a first pre-processing stage, performed by a unit 14, of compensating the image for any distortion it may have received in the public domain (e.g. geometrical distortion, digital-to-analogue or analogue-to-digital effects, luminance variation effects, etc). Subsequently, a unit 15 uses the ICA transform to convert the watermarked image into warped watermarked data. A unit 17 uses the warped watermarked data and the watermark pattern to produce a result indicative of the presence of the watermark in the watermarked image.

Figure 3:
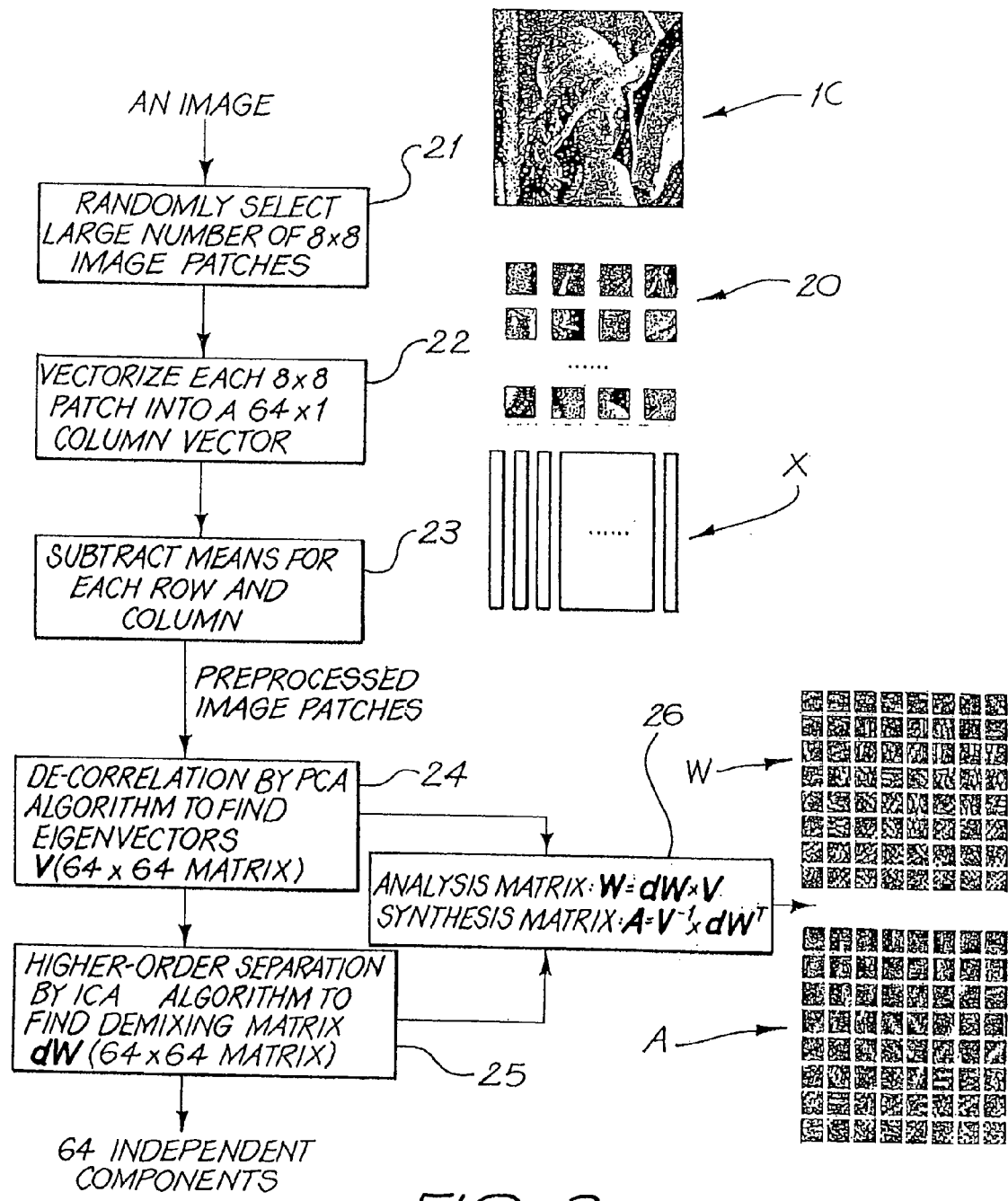
FIG. 3 is a flowchart of an ICA feature learning process which is part of the system of FIG. 2.

The procedure of adaptive ICA feature learning is illustrated in FIG. 3, as follows, where the left of the figure gives the process steps and elements on the right of the figure illustrate typical results of those steps:

1) In step 21, an image, such as image 10, is used to generate patches 20. These patches are 8×8 pixel arrays randomly selected from the image 10. Twelve such patches 20 are shown in FIG. 3, but in fact more preferably thousands of 8×8 image patches are randomly selected from the image in order to cover all kinds of image shapes in the image (note that an alternative to generating the patches randomly is to obtain the patches regularly block-by-block, e.g. by selecting blocks in turn adjacently from left to right and top to bottom).

2) In step 22, the 8×8 patches 20 are each vectorised into respective 64×1 column vectors, and the vectors are used as respective columns in a data matrix X. Thus the matrix X is 64 elements high and has a number of elements in the lateral direction equal to the number of patches 20.

3) In step 23, the rows and columns of the matrix X are processed by: subtraction from each of the elements of each row of the respective mean of that row, to form a modified matrix; then subtraction from each of the elements of each column of the modified matrix of the respective mean of that column. This results in a matrix of "preprocessed image patches" in which each of the rows or columns have zero means.

4) In step 24, "PCA pre-whitening" is carried out, in which the data matrix X is pre-whitened by performing a principal component analysis (PCA) to remove the row-wise correlation. Specifically, we first obtain the covariance matrix $Cov=X*X^T$, which is a 64×64 matrix. We then obtain its 64 eigenvectors, and form a whitening matrix V which has these eigen-vectors as respective rows.

In statistics this process is called 2nd-order de-correlation. The data matrix X is processed using V to form a new matrix X' given by $X'=V \times X$.

5) In step 25, "ICA learning" is carried out, e.g. the algorithm called fastICA by Aapo Hyvarinen [9]. This ICA learning uses the data matrix X' to form a demixing matrix, dW. The rows of an output matrix Y given by $Y=dW \times X'$ are as independent as possible when the system is convergent. The matrix dW is orthogonal because the input is 2nd-order uncorrelated.

6) In step 26, "ICA feature forming" is carried out to produce a matrix W (the "ICA transform" of FIG. 2), given by $W=dW \times V$. The rows of the matrix W represent 64 ICA weight filters of the image 10. The "inverse transform" of FIG. 2 is an inverse matrix A given by $A=W^{-1}$ (or equivalently $A=V^{-1} \times dW^T$). The columns of the matrix A represent the corresponding 64 ICA synthesis functions. Each of the matrices A and W is a 64×64 matrix. The synthesis matrix (set of synthesis filters) A and analysis matrix (set of analysis filters) W will be used later in the ICA watermark embedding and watermark detection processes.

Figure 4A:
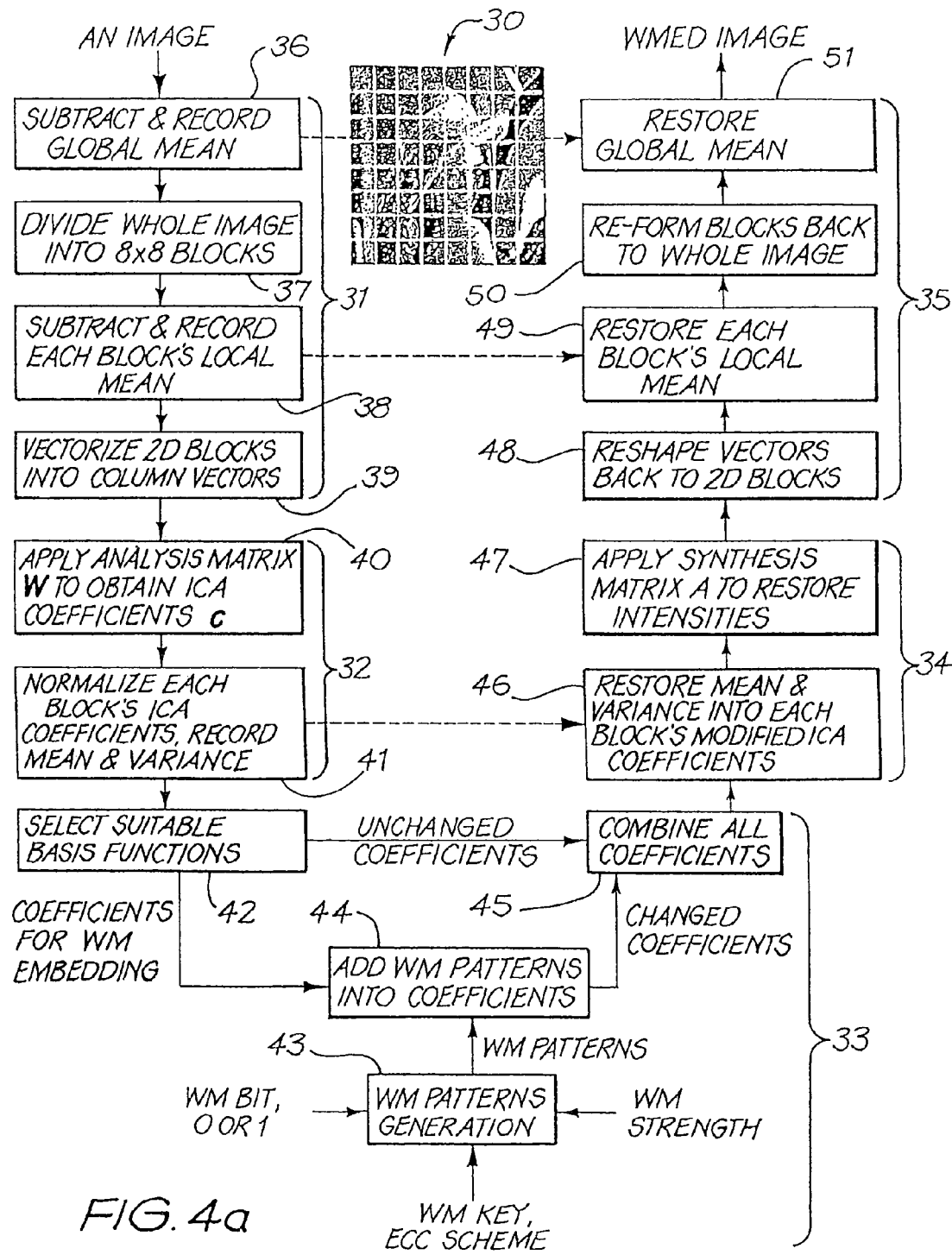
FIG. 4 is composed of FIG. 4(a) and FIG. 4(b) which respectively are a flowchart of an ICA-based watermark embedding process which is part of the system of FIG. 2, and an illustration of a classification of ICA coefficients performed in a step of the flowchart.

Turning to FIG. 4, the ICA-based watermark embedding procedure is shown. It includes five stages: (31) pre-processing the host image in the spatial domain, (32) ICA transforming the pre-processed host image into the ICA domain to derive ICA coefficients, by making use of the analysis matrix W, (33) watermark embedding onto the ICA coefficients, (34) an inverse ICA transform from ICA coefficients back to image intensities by making use of the synthesis matrix A, (35) post-processing in the spatial domain. We now explain these stages in detail:

Pre-processing in spatial domain (stage 31) is performed by obtaining the global mean value of the host image, subtracting it from each pixel value of the image, and also recording it for image restoration later (step 36). The host image is then divided into continuous blocks of 8 pixels by 8 pixels (step 37), illustrated as 30. The number of such blocks N depends upon the size of the host image (as shown in FIG. 4, N is 64, but the invention is not limited in this respect).

The local means of these blocks are obtained, subtracted from each pixel of the blocks, and recorded for image restoration later (step 38). The 8×8 pixel blocks are vectorized into N respective column vectors, each having 64 components (step 39), and the N columns vectors are put together to a 64 N matrix, Z.

The ICA transform (stage 32) is performed by applying the weight (analysis) matrix W to data matrix Z, to form a matrix $C=W \times Z$ (step 40). The portion of the matrix C corresponding to each block represents 64 ICA coefficients c. The 64 coefficients c of each block are normalized to zero mean and unit variance with the original mean and variance recorded for later restoration (step 41).

We turn now to the watermark embedding-stage (stage 33). Some important issues here are the selection of ICA coefficients for WM embedding, the formulation of WM patterns and their modulations with ICA coefficients.

Figure 4B:
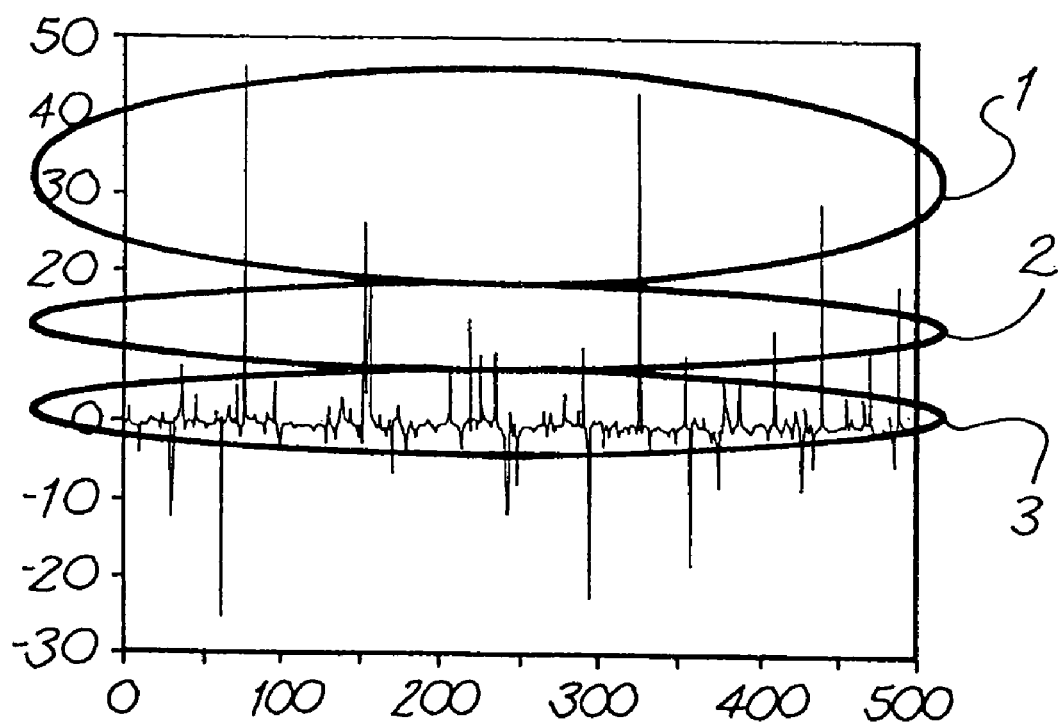

In a first step (step 42) of the watermark embedding stage (stage 33), we select which of the ICA coefficients in the image obtained in step 41 are suitable to be used for embedding watermarks. In order to fully utilize the masking effects for imperceptibility in this system, two schemes for selection of ICA coefficients for embedding are described here as follows (although the invention is not limited to these schemes and many other schemes may be developed for selecting the ICA coefficients to watermark embedding):

One possible strategy for the selection is based on the energy of the ICA coefficients corresponding to every ICA feature. The ICA analysis and synthesis functions are sorted in the order of their coefficients' energy (variance). The functions corresponding to large energies are put at the beginning of the list. To explain, FIG. 4(b) shows a typical distribution of ICA coefficients. We can classify the ICA coefficients of this distribution according to their magnitudes into three classes. The coefficients labelled as class 1 have big magnitudes, which means that they are robust in image operations (image processing operations try to avoid removing the large ICA coefficients). However, this may occasionally cause a big unexpected self-interference in correlation detection. Therefore, coefficients in class 1 are not desired to be used in this watermarking embodiment. For example, those coefficients with values greater than 30% of maximum coefficients are usually not modified, but their number is few. The coefficients labelled as class 2 have middle range magnitudes, but are still significant ICA features. Their correlation interference is much lower (which is more desirable for the spread-spectrum method) although they are less robust in compression than the class 1 coefficients. Class 2 coefficients also provide good imperceptabilty based on the known "self-masking" effect that small changes to ICA coefficients cannot be seen because the original ICA components have a higher energy, and the "neighbour-masking" from the coefficients in class 1 with large magnitudes. Usually, $17^{th}$-$48^{th}$ functions (i.e. class 2 coefficients) in the energy-ordered list are selected for watermark embedding. The ICA coefficients of class 3 are usually high-frequency features or noises, having small magnitudes, close to zero. They are the least robust components, and the embodiment does not perform watermarking of such coefficients. For example, the ICA coefficients with values less than 1% of maximum coefficients are preferably not used in the watermarking.

An optional enhancement to this strategy for the selection is to select coefficients within the class 2 which have further desired properties. Specifically, in this enhanced strategy the ICA analysis and synthesis functions derived in step 41 are ordered according to their three main properties: the edge's spatial location, orientation and its frequency magnitude. They are arranged so that the parameters of these properties change continuously and smoothly. For example, the functions may be mainly ordered from low-frequency to high-frequency, but those functions with similar frequencies are ordered according to direction of their phase in the range of angles 0 to $2\pi$ and with those functions with similar spatial locations also being placed adjacently. The purpose of this arrangement is to maximise the masking effect between components with similar characteristics. The watermark patterns will be embedded into a set of coefficients with adjacently arranged functions, and this set of coefficients is chosen such that all the coefficients are in class 2. A masking threshold can also be applied here for guaranteeing imperceptibility [6][7]. Properly choosing a certain range in this ordered function list could ensure the robustness under attacks. For example, functions within the lower-to-middle frequency range survive relatively well under image compressions. This technique provides good masking based on the known "neighbour masking" effect: the small scale watermarks cannot be seen because of other ICA components obtained through nearby ICA features with similar characteristics at a higher energy level.

Another important part of the watermark embedding stage (33) is the generation of the watermark patterns. For effective watermark embedding, it is beneficial to perform some pre-processing to format the watermark bits (0 or 1), obtained from the database 3 of FIG. 2, to produce watermark patterns with certain properties. The present embodiment employs a "spread spectrum" technique for generating the watermark patterns, which is commonly used in the fields of signal coding and watermarking. A key point of watermark pattern formulation in spread spectrum techniques is to transform narrow-band original watermark bits into wide-spectrum patterns. A private key is provided to keep the watermark pattern secure.

To make possible spread spectrum processing, in step 43 (which corresponds to unit 9 of FIG. 2) we generate several series of wide-band Gaussian distributed pseudo-random numbers, using a private key obtained from database 5 of FIG. 2, these series of numbers are modulated with respective ones of watermark bits, to transform the narrow-band original watermark bits to respective wide-spectrum patterns.

Therefore, these watermark patterns are uncorrelated to ICA coefficients on which the watermark patterns are to be embedded. This process is also known as direct-sequence Code Division Multiple Access (CDMA). This scheme also has the benefit of ensuring that the ICA-based watermarking is a secure system since only the party who has the private key is able to detect or remove the watermarks. Note that the scheme for generating the watermark patterns can be varied by optionally inserting some error-correcting codes (ECC) into the watermark bits to improve the robustness and extraction accuracy. Because of the CDMA, it is also possible to embed multiple watermark patterns onto the same portion of the ICA coefficients as long as the watermark patterns for different watermark bits are all orthogonal so that they do not interfere with each other.

Note that although the watermark bits are binary, the watermark patterns are real valued (or, rather, are one of a large number of intensity values). The total intensity of the watermark pattern is determined by a watermark strength parameter $\alpha$, which is used as a control variable to select a trade-off between watermark imperceptibility and robustness.

The watermark patterns generated as shown above are statistically orthogonal to each other. This is beneficial, for example, if multiple watermarks are to be embedded in the same piece of data. To improve the orthogonality of different series of random numbers orthogonal, we can optionally pre-process the patterns by standard $2^{nd}$-order decorrelation methods, e.g. PCA, to make them uncorrelated.

Although, as discussed above, the watermark patterns used are real-valued numbers, the embodiment is not limited in this respect. For example, orthogonal binary patterns (e.g. having the values +1/−1 or having the values 1/0) can also be used. Some such known series, suitable for use in the embodiment, are referred to as "m-sequences, "hadamard sequences", or "gold sequences".

Although these techniques produce a limited number of purely orthogonal patterns, FIG. 10(*a*) illustrates a technique for making it more secure. In this technique an m-sequence is input to a unit 80 which also receives a random sequence of +1/−1 bits (which may for example be produced by applying a sign operation to a sequence of real-valued random numbers having a zero means). The unit 80 performs an individual component-wise multiplication, to generate an encoded binary sequence which can be used as a watermark pattern.

In step 44 the watermark patterns obtained in step 43 are embedded in the ICA coefficients selected in step 42 to obtain watermarked coefficients. Assume the watermark pattern is a sequence of N numbers $\alpha\omega_i$, where i is an integer in the range 1 ... N and each value $\omega_i$ is a binary value. The ICA coefficients are denoted as f(n), where n is an integer running from 1 to N' (where N' is the total number of ICA coefficients). The watermark pattern is to be embedded in selected ICA coefficients such that n runs from j+1 to j+N. One possible embedding formula which may be used is:

$$f'(j+i)=f(j)(1+\alpha\cdot\omega_i) \quad (1)$$

Another embedding formula which may be used is:

$$f'(j+i)=f(j)+\alpha\omega_i \quad (2)$$

In either case, combining the watermarked coefficients f'(n) and those ICA coefficients f(n) which were unchanged produce final ICA coefficients c' (in the form of a matrix C') for each block of the watermarked image (step 45).

Note that it is important that the watermark pattern is long enough to have a good enough correlation level for robust detection. Optionally, to embed a watermark into a particular image, a number of patch blocks (e.g. 8×8 blocks) may be defined within the host data with the ICA analysis being performed block-by-block, and in step (44) any given watermark bit (0/1) is encoded in multiple blocks. The number of blocks used is selected based on the size of the host image. Experiment shows that in the embodiment a suitable number of blocks for one watermark bit is from 50 to 100. Sometimes, the number of watermark bits is too large to keep large number of blocks for one watermark bit, e.g. if there are less than 10 blocks per watermark bit.

Another way to increase the robustness is to cluster several watermark bits together to share watermark patterns. For example, one watermark bit may be embedded in two watermark patterns which respectively represent zero (0) or one (1). Two watermark bits may be embedded in four watermark patterns, which respectively represent 00, 01, 10 and 11. In general, for n watermark bits, $2^n$ watermark patterns are needed to represent respective possibilities for the realisations of the watermark bits. The length of the watermark patterns increases with n (e.g. in proportion to $2^n$), and so the correlation is more robust. In such a way, the detection rate for each watermark bit is increased.

The ICA components are not embedded in the ICA components of very small energy (e.g. those components having an intensity which is less than 1% of the intensity of the components of maximum intensity), or of very high energy (e.g. these components having an intensity more than 30% of the intensity of the components of maximum intensity).

Stage 34, the inverse ICA transform, includes a step 46 of restoring the original mean and variance of each block of the watermarked coefficients c' using the values obtained in step 41. Then, in step 47, these are transformed to an intensity data matrix Z' by applying the synthesis matrix A, which is the inverse of analysis matrix W, such that Z'=A×c'.

Stage 35, of post-processing in the spatial domain, includes a step 48 of reshaping the vectors in the matrix Z to form 8×8 blocks, and then a step 49 in which each of the pixels of each block are increased by the respective local mean of that block obtained in step 38. In step 50 the blocks are arranged to form a complete image. Finally, in step 51, the global mean obtained in step 36 is added to each pixel value to obtain a final watermarked image.

Figure 5:
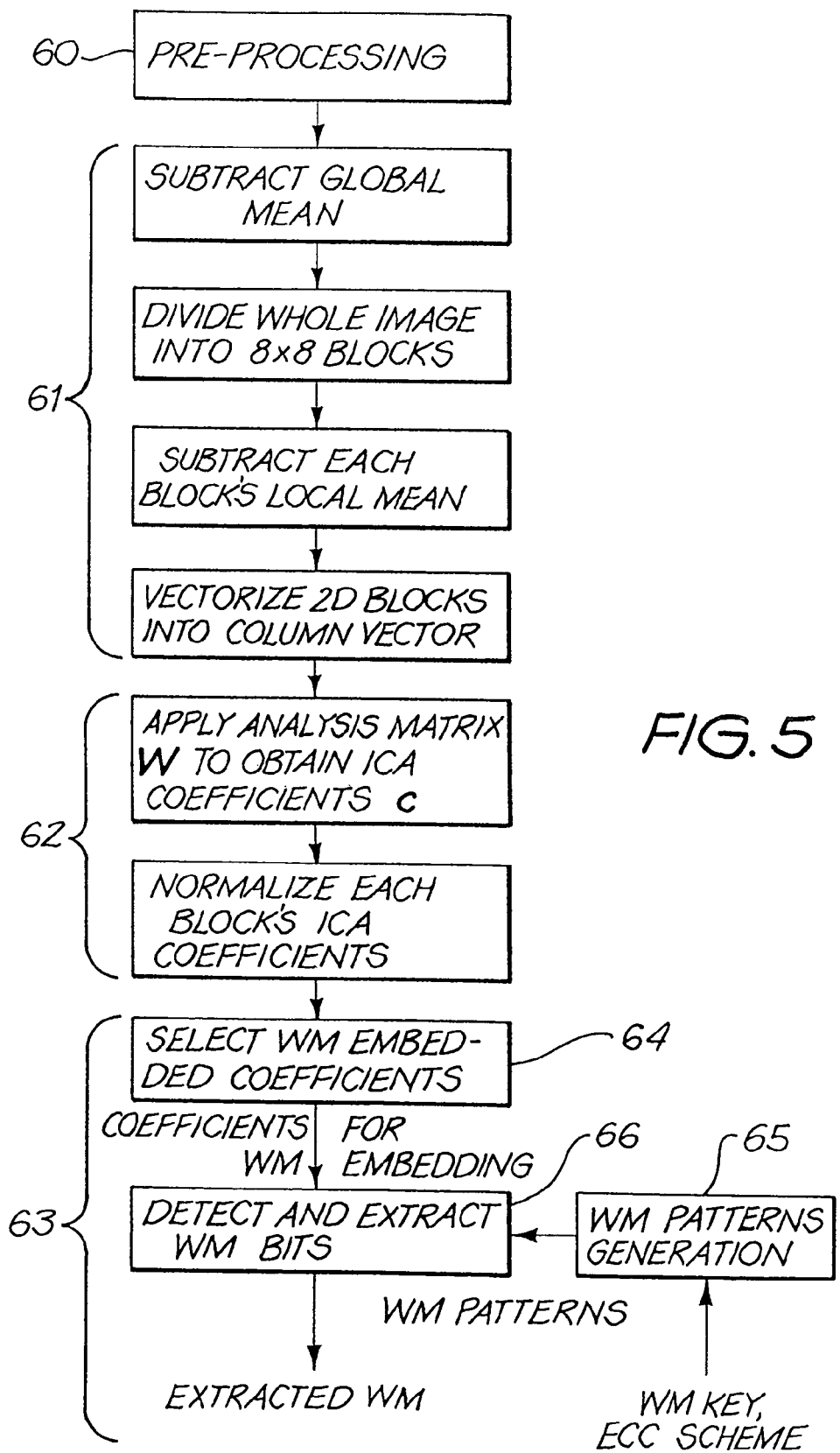
FIG. 5 is a flowchart of an ICA-based watermark detection process which is a part of the system of FIG. 2.

We now turn to the ICA watermark detection, which is illustrated in FIG. 5. ICA watermark detection is the counterpart of the embedding process, and aims to detect the embedded watermark from the watermarked image obtained in FIG. 4 (or a version of it which has been processed in the public domain by unknown techniques).

The procedure of the detection process, as shown in FIG. 5 includes the general stages of: pre-processing to compensate for any distortion to the image while it was in the public domain (e.g. to compensate for geometric distortion, digital-to-analogue or analogue-to-digital distortion, luminance modification) which is performed by the unit 14 in FIG. 2 (step 60); pre-processing in spatial domain (stage 61), an ICA transform (stage 62) and watermark detection (stage 63). Note that this method does not employ any knowledge of the original image 10, although it assumed that there is access to the databases 3 and 5.

The pre-processing (stage 61) is exactly same as the pre-processing procedure 31 of FIG. 4, and results in is a data matrix Z", which may or may not be the same as the watermarked data matrix Z'.

In the ICA transform (stage 62) the same analysis matrix W is used to transform pre-processed image data, Z", to ICA coefficients c"=W×Z" with zero mean and unit variance.

In watermark detection (stage 63), ICA coefficients are selected in step 64 by the same method as in step 42 of FIG. 4. Watermark patterns are generated in step 65 according to same key and ECC method as in step 43 of FIG. 4, but not using the parameter a. In step 66 we calculate the correlation δ of the watermark pattern $\omega_i$ directly with the selected components f" of c" according to the formula:

$$\delta = \frac{\sum_{i=1}^{N} f''(j+i)\omega_i}{N} \quad (3)$$

which should converge to a certain non-zero value according to the central limit theorem. We compare the correlation value δ with a detection threshold T. The detection threshold may be selected, for example, such that if we consider two different watermark patterns $\omega_i^0$ and $\omega_i^1$ then the threshold value for watermark pattern $\omega_i^0$ may be the average value of the auto-correlation of $\omega_i^1$ and the correlation of $\omega_i^0$ and $\omega_i^1$. Conversely, the then the threshold value for watermark pattern $\omega_i^1$ may be the average value of the autocorrelation of $\omega_i^1$ and the correlation of $\omega_i^0$ and $\omega_i^1$. This technique relies on an assumption that the similarity of one watermark pattern to itself in terms of correlation is always greater than that to the host image patch and other watermark patterns.

An advantage of such a correlation-based WM embedding-detection technique is that it can be performed very quickly by known processors. Additionally, it can be performed without knowing the original host image 10. It can be very accurate when detection is performed on the raw watermarked image, because we adopt the CDMA scheme. Under various attacks, like image compression, image distortion, we can normally use more coefficients to embed and detect watermark patterns to increase the extraction accuracy dramatically. It is true that the capacity of the watermark bits will be decreased at the same time, but this is a minor issue in copyright protection since only a small amount of copyright data usually has to be included in the watermark data.

Figure 10A:
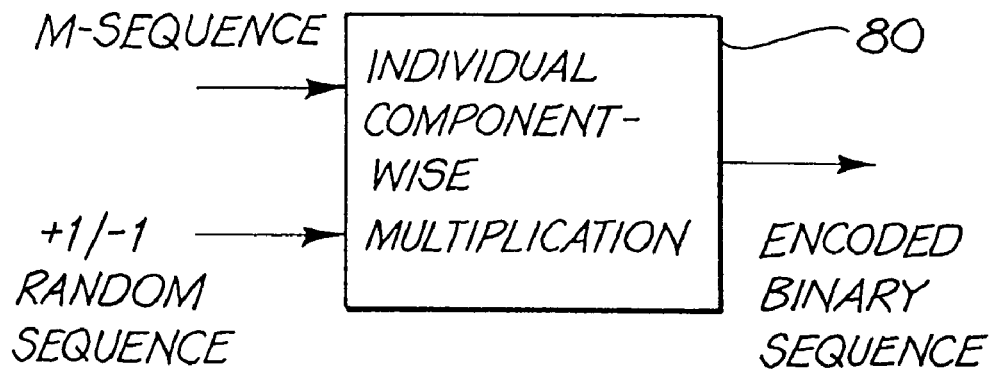
FIG. 10, which is composed of FIGS. 10(a) and 10(b), illustrates encoding and decoding process in a further embodiment of the invention.
Figure 10B:
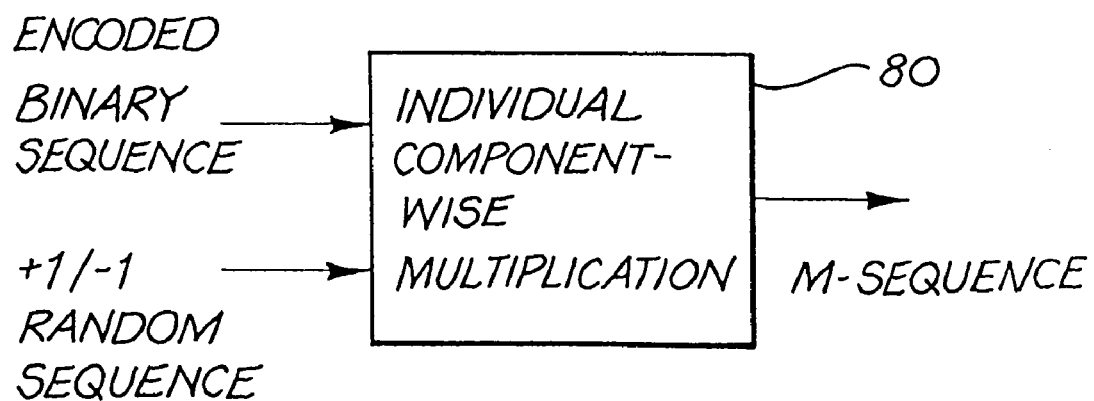

In the case that the watermark patterns were produced using the technique shown in FIG. 10(a), the detection steps 65 and 66 are replaced by the process shown in FIG. 10(b). In this case, the encoded binary sequence is obtained fom the coefficients selected in step 64. This sequence is input to a unit 80 performing the same function as the unit 80 of FIG. 10(a). Also input to the unit 80 is the same random sequence used in FIG. 10(a). The unit 80 thus outputs the m-sequence used to produce the watermark data by cross-correlating the extracted binary sequence with the random sequence.

Figure 6:
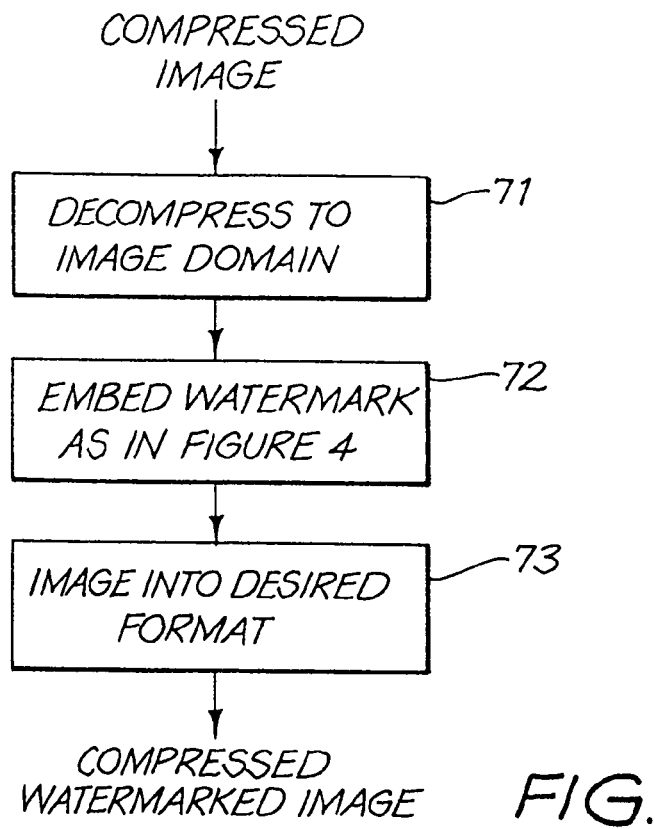
FIG. 6 is a flowchart illustrating how the embedding process of FIGS. 2, 3 and 4 can be applied to compressed Images.

Note also that the present technique is not limited to watermarking raw images. Rather, compressed images also can be treated as the host images. This is illustrated in FIG. 6. In this watermark embedding process, two additional steps are necessary: first the compressed image is de-compressed (step 71), then the watermark embedding process is carried out (step 72), and the resultant watermarked image recompressed (step 73) to give a compressed watermarked image with proper settings of image size and quality. The compressed images may for example be in the formats JPEG, JPEG2000 etc.

Figure 7:
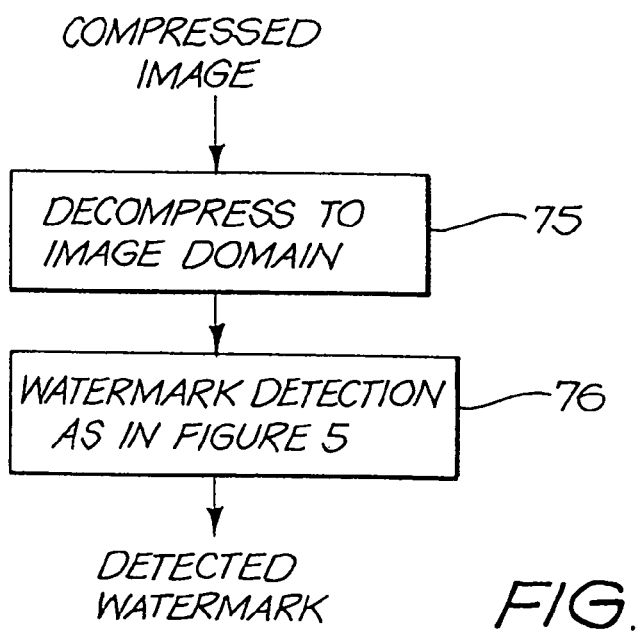
FIG. 7 is a flowchart illustrating how the ICA-based WM Detection process of FIG. 5 can be applied to the images obtained in the process of FIG. 6.

Similarly, the corresponding watermark detection process, illustrated in FIG. 7, includes a step 75 of image de-compression, prior to a watermark detection process (step 76) which is identical to the process shown in FIG. 5.

Apart from image compression, other operations conventionally performed on images, such as geometric distortion, image recapturing, digital-to-analogue (DA) and analogue-to-digital (AD) conversion, etc, may also intentionally or accidentally alter the watermarked image. These operations usually can be corrected by using some standard image restoration methods as a pre-processing step before the watermark detection procedure. For example, image normalization based on spatial moments can be used for removing geometric distortion; digital filtering on different colour channels and pixel luminance has been used to remove noise introduced in an DA/AD process. These operations can be carried out according to conventional techniques.

We now turn to a description of four ways in which the embodiments described above may be varied within the scope of the invention. Each of these variants is presented below as a respective embodiment of the invention. However, these variants may be freely combined as desired. In summary they are:

1. Instead of the database 1 storing data which is the original image, it may alternatively be transformed image data, e.g. the wavelet coefficients of an JPEG2000 compressed image.
2. In contrast to the detection method describe above, the detection method may employ the original host image. Preferably, this not only changes the detection technique, but also involves an alteration in the corresponding embedding technique.
3. The technique described above of adding the watermark data by a linear additive process may be varied, for example by quantizing the ICA coefficients based on the watermark data.
4. Using a key to select which ICA components are used for embedding watermarks.

Embodiments employing these four variants will now be described in detail:

1. Watermarking Compressed Image Data

As discussed above, in the embodiment shown in FIG. 2, the host images contained in the database 1 are original images in the pixel domain, and in the embodiments shown in FIGS. 6 and 7 a de-compressed image in the pixel domain is used as the host image for ICA-watermarking, then compressed again.

By contrast, in the embodiment discussed here, although the overall structure is still as shown in FIG. 1, the data contained in the database 1 is transformed/compressed image data itself, not de-compressed image data obtained from it. For example, the data may be multi-resolution wavelet coefficients in a JPEG2000 compressed image. These coefficients are available in the JPEG2000 image file, and a skilled reader will be aware of techniques for extracting them from the JPEG2000 file and restoring them to the JPEG2000 file after watermarking. Let us assume that these wavelet coefficients are contained in the database 1.

Figure 8:
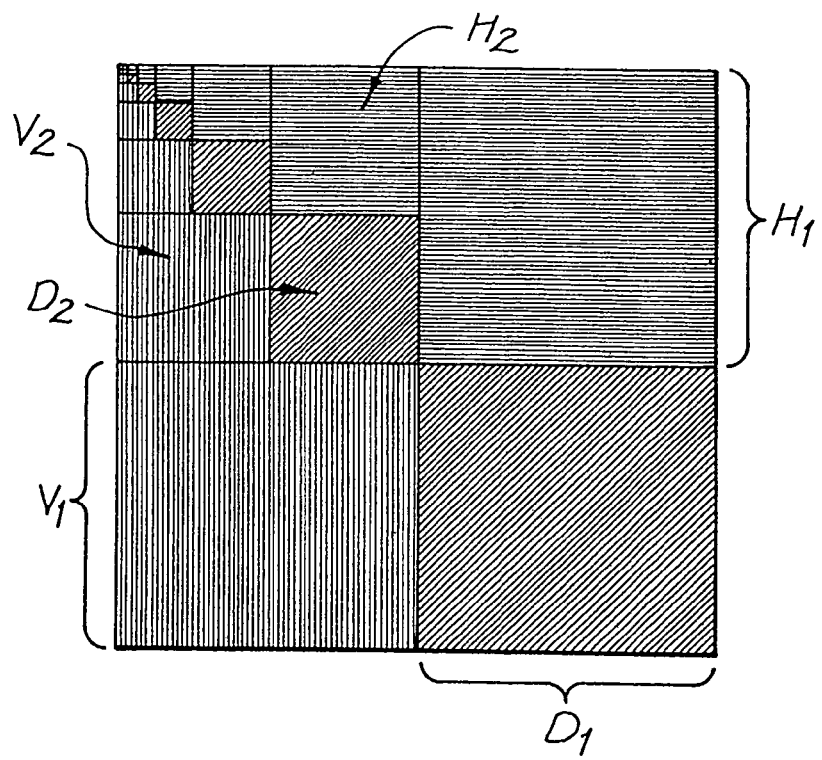
FIG. 8 illustrate multi-resolution wavelet coefficients produced in the known JPEG2000 algorithm.

FIG. 8 is a typical example of multi-resolution wavelet coefficients produced by a known JPEG2000 algorithm. The coefficients are in 6 levels with size in 4:1 ratio between adjacent levels. Each level has horizontal (H), vertical (V) and diagonal (D) blocks. H1, V1 and D1 are respectively 1st-level horizontal, vertical and diagonal blocks, and H2, V2 and D2 are respectively 2nd-level horizontal, vertical and diagonal blocks.

Figure 9:
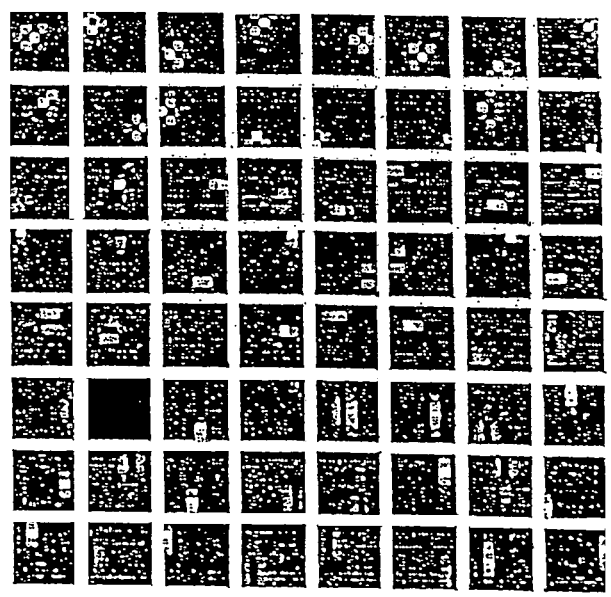
FIG. 9 illustrates ICA coefficients produced from the wavelet coefficients shown in FIG. 8.

In this embodiment, the stage of ICA feature learning is performed individually for each block, e.g. H1 or V1, as the source to produce the corresponding ICA analysis and synthesis filters (W and A). FIG. 9 shows a typical example for a set of 64 analysis filters, W.

In each of the embedding and detection stages, the steps 7 and 15 are performed separately for each block. In these steps, the filters corresponding to each block are used to transform or inverse-transform that block.

2. Detection using the Host Image

As described above, the embodiment of FIGS. 2 to 5 does not use the original host image during the detection process (so-called "blind detection"). By contrast, the embodiment now described does use the original host image in the detection process (so-called "non-blind detection").

This embodiment still has the general structure shown in FIGS. 2 to 5 but the detection process of FIG. 5 is modified by replacing the use of Eqn. (3) in step 66 by the steps of: (1) obtaining the ICA coefficients from the host image, and (2) subtracting them from the ICA coefficients obtained in step 64 to obtain WM patterns close to original WM patterns.

Because the host image is available in detection, the interference from the host image in spread spectrum's correlation calculation can be reduced to a minimum by subtracting the host image's coefficients. Additionally, the more significant functions are used in WM embedding, the less distortion may be resulted due to any imaging operations.

In this embodiment, preferably not only the detection process but also the embedding process is slightly different from the embodiment of FIGS. 2 to 5. In this case, it is desired to embed WM patterns into high-energy ICA coefficients, which are modulated by small changes visually blocked by self-masking effect. For example, $1^{st}$-$10^{th}$ functions are desired here. Whereas, in detection methods which do not use the original host image in the detection stage, we are usually careful to avoid using large ICA coefficients, because this may occasionally cause a big interference in correlation detection, in contrast, for method using host image, large coefficients are desired to be used for watermarking. Interference is kept at minimum due to subtracting host image's coefficients.

3. Watermarking the ICA Coefficients by Quantization

As discussed above, in step 44 of FIG. 4 the watermark patterns are added to the selected ICA coefficients by linear addition. The present embodiment, by contrast, though in other respects identical with the embodiment of FIGS. 2 to 5, uses a quantization method to embed the watermark patterns. The embodiment uses pre-selected individual ICA coefficients, or sets of ICA coefficients, and sets these pre-selected ICA coefficients ("reconstruction points") according to the watermark data. In the case that individual ICA coefficients are modified, this is referred to here as "scalar quantization". In the case that sets of ICA coefficients are modified, this is referred to here as "vector quantatization". Similarly, the detection process in this embodiment detects the watermarks by modifying step 66 of FIG. 5 by mapping the reconstruction points and determining what watermark bits are stored there. This process is referred to here as a "quantize-and-replace" strategy.

First, we consider a scalar quantization scheme suitable for use in the embodiment. In this technique, pairs of the ICA coefficients are chosen, and their initial magnitudes are indicated here as f(i) and f(j). The absolute difference between them is given by $$\Delta = |f(i)| - |f(j)|.$$

In order to embed one WM bit, denoted as $w_n$ which may be 0 or 1, the coefficient pair f(i) and f(j) is modified such that the absolute distance becomes $$\Delta' = \begin{cases} \leq -Q, & \text{when } w_n = 0 \\ \geq Q, & \text{when } w_n = 1 \end{cases}$$

where Q is a parameter controlling the detection robustness or tolerance. The changes are such that (i) the changes are as small as possible, and (2) they use self-imperceptibility feature as much as possible. Specifically, the changes are as follows:

$$\delta f(i) = |\Delta - Q| \times \frac{f(i)}{f(i) + f(j)} \text{ and } \delta f(j) = |\Delta - Q| \times \frac{f(j)}{f(i) + f(j)}.$$

This scheme can be simply extended to vector quantization method as follows. Among the selected ICA coefficients within one block or multiple blocks, 2×m coefficients are chosen as $f_1(i) \ldots f_m(i)$ and $f_1(j) \ldots f_m(j)$. The absolute difference between two groups is given by $$\Delta f_{total}(i) - f_{total}(j),$$

where $f_{total}(i) = |f_1(i)| + |f_2(i)| + \ldots + |f_m(i)|$ and $f_{total}(j) = |f_1(j)| + |f_2(j)| + \ldots + |f_m(j)|$. In order to embed one WM bit, denoted as $w_n$ which may be 0 or 1, the coefficients $f_1(i) \ldots f_m(i)$ and $f_1(j) \ldots f_m(j)$ are modified such that the absolute distance becomes $$\Delta' = \begin{cases} \leq -Q, & \text{when } w_n = 0 \\ \geq Q, & \text{when } w_n = 1 \end{cases}$$

where Q is, again, a parameter controlling the detection robustness or tolerance. Specifically, the changes are:

$$\delta f_{total}(i) = |\Delta - Q| \times \frac{f_{total}(i)}{f_{total}(i) + f_{total}(j)},$$

$$\delta f_{total}(j) = |\Delta - Q| \times \frac{f_{total}(j)}{f_{total}(i) + f_{total}(j)}, \text{ and}$$

$$\delta f_l(i) = \delta f_{total}(i) \times \frac{|f_l(i)|}{f_{total}(i)} \text{ and } \delta f_l(j) = \delta f_{total}(j) \times \frac{|f_l(j)|}{f_{total}(j)} \text{ for } l = 1, \ldots, m.$$

Note that the coefficients' modification in vector quantization can be smaller than those in scalar quantization for the same robustness parameter value Q.

Thus, vector quantization provides better imperceptibility and better robustness In the detection stage, the WM bit $w_n$ is simply detected by comparing the coefficient pair or two coefficient groups. Specifically, if $|f(i)| \leq |f(j)|$ (in the case of scalar quantization) or $f_{total}(i) \leq f_{total}(j)$ (in the case of vector quantiztion) then this implies that $w_n=0$. Conversely, if $|f(i)| > |f(j)|$ (in the case of scalar quantization) or $f_{total}(i) > f_{total}(j)$ (in the case of vector quantization) then this implies that $w_n=1$.

The technique explained here can be easily extended to embedding multiple watermark bits in one quantize-and-replace step. For example, consider three of the selected ICA coefficients having respective intensities f(i), f(j) and f(k). These three intensities may be modified so that they are each at least Q apart, and such that the order of the intensities encodes the watermark bit. For example, if the highest modified intensity is written as H, the lowest modified intensity is written as L, and the other modified intensity is written as M, then the correspondence of the watermark bits to be encoded ($w_n$) may be as given in Table 1.

TABLE 1

| $w_n$ | f(i) | f(j) | f(k) |
|---|---|---|---|
| 00 | H | M | L |
| 01 | M | H | L |

TABLE 1-continued

| $w_n$ | f(i) | f(j) | f(k) |
|---|---|---|---|
| 10 | H | L | M |
| 11 | L | H | M |
| XX | M | L | H |
| XX | L | M | H |

In Table 1, XX means a pattern reserved for future use. In other words, there never are occasion on which the value of the ICA coefficients are quantized such that f(k) becomes the highest.

Contrary to linear additive methods, these various quantization methods are non-linear. They can utilize the high-energy coefficients even though the original image is not available. This scheme treats both high and low magnitude coefficients with equal weight.

The strategy of energy sorting in step 42 is suitable in this embodiment, since the quantization scheme suppresses the image self-noise (interference), so that it is desirable to use the high-energy ICA coefficients. Significant features imply good self-masking effect for quantization changes. Because of their large magnitude, a large quantization tolerance is available to enlarge the distance between reconstruction points but still keep the imperceptibility of the watermarking. Additionally, these significant features have less distortion under imaging operations, e.g. compression. The embodiment therefore performs its equivalent of step 42 by sorting the ICA coefficients in order of their average energy, and the watermark patters may be embedded in the ICA coefficients of class 1 and the highest energy components in class 2 in FIG. 7, e.g. $1^{st}$-$10^{th}$ ICA coefficients.

4. Use of a Private Key to Select ICA Components for Embedding

It is advantageous is to preserve the security of embedded watermark, although the scheme of watermark embedding is usually required to be disclosed to public. In order to do this, the above scheme needs to use a private key to protect its security. In the present embodiment a private key is used to generate a sequence of pseudo-random numbers, in a way similar to the spread spectrum technique for generating the watermarks described above. In this embodiment, pseudo-random numbers are not necessarily used to make the watermark patterns, but alternatively or additionally are used to select, from the ICA coefficients selected in step 42, the ICA coefficients where the watermark embedding quantize-and-replace process will place and which class the coefficients belong to, i.e. i, j or k. For example, suppose the first 10 ICA features in energy order list are selected for this quantization watermark embedding. Based on a private key, two random number sequences with one odd number and another even number may be generated, e.g. a group 1 which is 1, 5, 9, 3, 5, 7, 7, 1, . . . and a group 2 which is 8, 2, 8, 6, 2, 4, 10, 4, . . . Corresponding items from these two series are paired (e.g. 1 with 8, 5 with 2, etc.). Each pair of odd and even numbers is the selected coefficients for quantization embedding in each block, where odd number belongs to group i and even is group j. For a different private key, the sequence is different, and therefore the watermarking is secure from attacks.

Although the above variants of the embodiment of FIGS. 2 to 5 have been described in detail, many other variants of the embodiments are possible within the scope of the invention and their implementation will be clear to a skilled reader.

As a first example, whereas the embodiments above derive the transforms W and A constructively by a relatively complex set of standard ICA operations, alternative embodiments of the invention may derive the transforms W and A by less computationally intensive and time intensive techniques. As a first step, the data may be analysed to make a selection from a library of previously determined sets of transforms W and A. This selection is much faster than deriving the transforms W and A constructively. In a second step, the transforms W and A may be modified based on the image, e.g. making use of Gabor functions, since the properties of an ICA are quite close to those of Gabor functions. Thus, the derivation of W and A may be considered as "semi-adaptive". (Note that this possibility has the further advantage that less memory is required to store W and A for use in the detection step, since it is only necessary to store, for a given image, which of the previously determined transforms were used to watermark it, and how they were adapted.)

As a second example, the techniques described above may be extended to watermarking data which is audio data or video data, making use of known ICA techniques for these forms of data.

The present invention be applied to many areas. For example, it can be used for copyright protection: embedding copyright information as a watermark into the host image to be protected, so that the copyright information can be extracted later to claim the ownership of the host image. Also it can be used for image authentication: the embedded watermark information can also be used to identify any alteration in the image itself and altered locations by detecting the existence of ICA-based WM patterns. Also it can be used for data hiding in image: information such as a description, related knowledge about the image or indexing data can be embedded as a watermark so that such information is protected and attached. Also, it can be used image transaction tracking: the transaction path of the image can be traced by embedding a watermark into the image whenever it is transmitted, and extracting this data later.

Two particularly useful applications of the present invention are:
- to provide a first watermark on multi-media data such as a movie (i.e. a watermark-based copyright protection scheme on commercial movies to trace the unauthorized camera recording), and
- to embed metadata into multi-media data for extra/hidden information transfer.

REFERENCES

The disclosure of the following documents is incorporated by reference:

[1] C. Podilchuk and W. Zeng, "Image-adaptive watermarking using visual models", IEEE Journal on Selected Areas in Communications, vol. 16, no. 4, pp. 525-539, 1998.
[2] B. A. Olshausen and D. J. Field, "Sparse Coding with an Overcomplete Basis Set: A Strategy employed by V1?", Vision Res., 37 (23), 1997.
[3] A. J. Bell and T. J. Sejnowski, "The 'Independent Components' of Natural Scenes are Edge Filters", Vision Res., 37 (23): 3327-3338, 1997.
[4] B. A. Olshausen and D. J. Field. "Emergence of Simple-Cell Receptive-Field Properties by Learning a Sparse Code for Natural Images", Nature, 381:607-609, 1996.
[5] John Wiley, L. A. Olzak, and J. P. Thomas, "Handbook of Perception and Human Performance. Volume 1: Sensory Processes and Perception. Chapter 7: Seeing Spatial Patterns." University of California, Los Angeles, Calif., 1986.
[6] G. E. Legge, "Spatial Frequency Masking in Human Vision: Binocular Interactions", J. Opt. Soc. Am. A, 69 (6): 838-847, June 1979.
[7] H. R. Wilson, D. K. McFarlane, and G. C. Phillips, "Spatial Frequency Tuning of Orientation Selective Units Estimated by Oblique Masking", Vision Research, 23 (9): 873-847, 1983.
[8] J. H. van Hateren and A. van der Schaaf, "Independent Component Filters of Natural Images compared with Simple Cells in Primary Visual Cortex", Proc. Royal Soc. Lond. B, 265:359-366, 1998.
[9] A. Hyvarinen, "Fast and Robust Fixed-point Algorithms for Independent Component Analysis", IEEE Transactions on Neural Networks, 10 (3): 626-634, May 1999.

The invention claimed is:

1. A method for embedding a watermark in data, including a processor to perform the steps of:
analysing the data to derive a transform matrix for extracting from the data amplitudes of statistically mutually independent components of the data;
encoding the data using the transform matrix;
classifying said components in accordance with their energies, into higher, lower and medium energy ranges;
selecting the components classified in said medium energy range;
modifying at least a portion of the selected components using a watermark pattern; and
decoding the data using an inverse of the transform matrix to obtain watermarked data in which the watermark pattern is embedded.

2. The method according to claim 1, wherein the components are obtained by an independent component analysis (ICA).

3. The method according to claim 2, wherein the ICA is performed using multiple patches of the data.

4. The method according to claim 3 including performing a principal component analysis of a matrix formed using the patches of the data.

5. The method according to claim 1, wherein the selected components are further selected based on a component similarity criterion.

6. The method according to claim 1, wherein the data is image data, and the watermarked data is watermarked image data.

7. The method according to claim 6, wherein the image data is obtained by decompressing compressed image data, the method further including a step of compressing the watermarked image data.

8. The method according to claim 1, wherein the data is compressed image data.

9. The method according to claim 1 further comprising a step of generating the watermark pattern using watermark data and a key for generating at least one pseudorandom pattern, the pseudorandom pattern being modulated with the watermark data.

10. The method according to claim 1, wherein the selected components are modified by adding the watermark pattern linearly to it.

11. The method according to claim 1, wherein the selected components are modified to make the values of groups of two or more items of the encoded data differ by values which are in predetermined ranges.

12. The method of detecting a presence of the watermark pattern in watermarked data derived from a method according to claim 1, the detecting method comprising:

an encoding step of encoding the watermarked data using a transform matrix encoding properties of the watermarked data; and an examination step of using a watermark pattern to examine at least a part of the encoded watermarked data for the presence of the watermark pattern.

13. The method according to claim 12 further comprising a step before the examination step of generating the watermark pattern from watermark data and a key.

14. The method according to claim 12, wherein the part of the encoded watermarked data is selected based on properties of the encoded watermarked data.

15. The method according to claim 12, wherein the examination step includes calculating a correlation between the watermark data and the part of the encoded watermarked data, and determining if the correlation is above a threshold.

16. The method according to claim 12, wherein the examination step includes comparing the values of different ones of the predetermined items of the encoded watermarked data.

17. The method according to claim 12, wherein the examination step includes subtracting from the encoded watermarked data corresponding values of encoded data obtained in the encoding step of claim 1.

18. An apparatus for detecting a presence of the watermark pattern in watermarked data derived from a method according to claim 1, the apparatus comprising a processor arranged to:
    encode the watermarked data using a transform matrix encoding properties of the watermarked data; and
    use a watermark pattern to examine at least a part of the encoded watermarked data for the presence of the watermark pattern.

19. The apparatus according to claim 18, wherein the processor is arranged, before using the watermark pattern to examine at least a part of the encoded watermarked data for the presence of the watermark pattern, to generate the watermark pattern from watermark data and a key.

20. The apparatus according to claim 18, wherein the part of the encoded watermarked data is selected based on properties of the encoded watermarked data.

21. The apparatus according to claim 18, wherein the processor is arranged to use the watermark pattern to examine at least a part of the encoded watermarked data for the presence of the watermark pattern by calculating a correlation between the watermark data and the part of the encoded watermarked data, and determining if the correlation is above a threshold.

22. The apparatus according to claim 18, wherein the processor is arranged to use the watermark pattern to examine at least a part of the encoded watermarked data for the presence of the watermark pattern by comparing the values of different ones of the predetermined items of the encoded watermarked data.

23. The apparatus according to claim 18, wherein the processor is arranged to subtract from the encoded watermarked data corresponding values of encoded data obtained in the encoding step of claim 1 when using the watermark pattern to examine at least a part of the encoded watermarked data for the presence of the watermark pattern.

24. The apparatus according to claim 18, wherein the part of the encoded watermarked data is selected based on properties of the encoded watermarked data.

25. An apparatus for embedding a watermark in data, including a processor arranged to:
    analyse the data to derive a transform matrix for extracting from the data amplitudes of components of the data which are statistically mutually independent;
    encode the data using the transform matrix;

classify said components in accordance with their energies, into higher, lower and medium energy ranges;
select the components classified in said medium energy range;
modify at least a portion of the selected components using a watermark pattern; and
decode the data using an inverse of the transform matrix to obtain watermarked data in which the watermark pattern is embedded.

26. The apparatus according to claim 25, wherein the processor is arranged to obtain the components by an independent component analysis (ICA).

27. The apparatus according to claim 26, wherein the processor is arranged to perform the ICA using multiple patches of the data.

28. The apparatus according to claim 27, wherein the processor is arranged to perform a principal component analysis of a matrix formed using the patches of the data.

29. The apparatus according to claim 25, wherein the processor is arranged to further select the components based on a component similarity criterion.

30. The apparatus according to claim 25 for watermarking image data.

31. The apparatus according to claim 30 which includes decompression means for obtaining the image data by decompressing compressed image data, and compression means for compressing the watermarked image data.

32. The apparatus according to claim 25 further comprising a database for storing watermark data and a database holding a key, the processor being arranged to generate at least one pseudorandom pattern, and modulate the pseudorandom pattern using the watermark data.

33. The apparatus according to claim 25, wherein the selected components are modified by adding the watermark pattern linearly to it.

34. The apparatus according to claim 25, wherein the selected components are modified to make the values of groups of two or more items of the encoded data differ by values which are in predetermined ranges.

35. A method for embedding a watermark in data, including a processor to perform the steps of:
    analysing the data to derive a transform matrix for extracting from the data amplitudes of statistically mutually independent components of the data;
    encoding the data using the transform matrix;
    modifying at least a portion of the encoded data with a watermark pattern; and
    decoding the data using an inverse of the transform matrix to obtain watermarked data in which the watermark pattern is embedded,
    wherein the modified portion of the encoded data is selected by ordering the components by their amplitudes and selecting components having amplitudes within one or more amplitude ranges, and is further selected by ordering the components according to their main properties, and selecting components having similar parameters of the main properties,
    wherein the component main properties include spatial location, orientation and frequency magnitude.

36. An apparatus for embedding a watermark in data, including a processor arranged to:
    analyse the data to derive a transform matrix for extracting from the data amplitudes of components of the data which are statistically mutually independent;
encode the data using the transform matrix; modify at least a portion of the encoded data using a watermark pattern; and decode the data using an inverse of the transform matrix to obtain watermarked data in which the watermark pattern is embedded,
wherein the modified portion of the encoded data is selected by ordering the components by their amplitudes and selecting components having amplitudes within one or more amplitude ranges, and is further selected by ordering the components according to their main properties, and selecting components having similar parameters of the main properties,
wherein the component main properties include spatial location, orientation and frequency magnitude.

* * * * *